United States Patent
Groncki, III

(10) Patent No.: US 10,429,103 B2
(45) Date of Patent: Oct. 1, 2019

(54) REFRIGERATIVE SYSTEM INCLUDING A REFRIGERATIVE CONDENSER/COOLER

(71) Applicant: Theodore John Groncki, III, Joliet, IL (US)

(72) Inventor: Theodore John Groncki, III, Joliet, IL (US)

(*) Notice: Subject to any disclaimer, the term of this patent is extended or adjusted under 35 U.S.C. 154(b) by 0 days.

(21) Appl. No.: 15/674,146

(22) Filed: Aug. 10, 2017

(65) Prior Publication Data

US 2018/0066874 A1  Mar. 8, 2018

Related U.S. Application Data

(60) Provisional application No. 62/372,895, filed on Aug. 10, 2016.

(51) Int. Cl.

| | |
|---|---|
| *F25B 15/02* | (2006.01) |
| *F25B 39/04* | (2006.01) |
| *F25B 39/02* | (2006.01) |
| *F28D 3/02* | (2006.01) |
| *F28D 3/04* | (2006.01) |
| *F25B 45/00* | (2006.01) |

(52) U.S. Cl.
CPC .......... *F25B 15/025* (2013.01); *F25B 39/026* (2013.01); *F25B 39/028* (2013.01); *F25B 39/04* (2013.01); *F28D 3/02* (2013.01); *F28D 3/04* (2013.01); *F25B 45/00* (2013.01); *F25B 2339/0242* (2013.01); *F25B 2339/046* (2013.01); *F25B 2400/05* (2013.01); *Y02A 30/277* (2018.01); *Y02B 30/62* (2013.01)

(58) Field of Classification Search
CPC ...... F25B 39/026; F25B 45/00; F25B 15/025; F25B 39/028; F25B 39/04
See application file for complete search history.

(56) References Cited

U.S. PATENT DOCUMENTS 6,009,721 A * 1/2000 Fukuda ................... F25B 15/02
62/476

* cited by examiner

*Primary Examiner* — Ana M Vazquez
(74) *Attorney, Agent, or Firm* — Wood, Phillips, Katz, Clark & Mortimer

(57) ABSTRACT

A liquid absorption refrigeration system and a tube and channel heat exchanger include: an absorber section to contain a saturated strong solution; a pump connected to an outlet of the absorber section to receive saturated strong solution therefrom; a regenerator section connected to an outlet of the pump to receive a flow of pressurized saturated strong solution therefrom; an expansion device connected to an outlet of the regenerator section to receive a flow of subcooled strong solution therefrom; an evaporator section connected to an outlet of the expansion device to receive the subcooled strong solution therefrom, the evaporator section connected to the absorber section to return strong solution thereto; and a condenser section connected to the evaporator section to receive a refrigerant evaporated from the subcooled strong solution in the evaporator, the condenser section connected to the absorber section to return liquid refrigerant thereto.

5 Claims, 8 Drawing Sheets

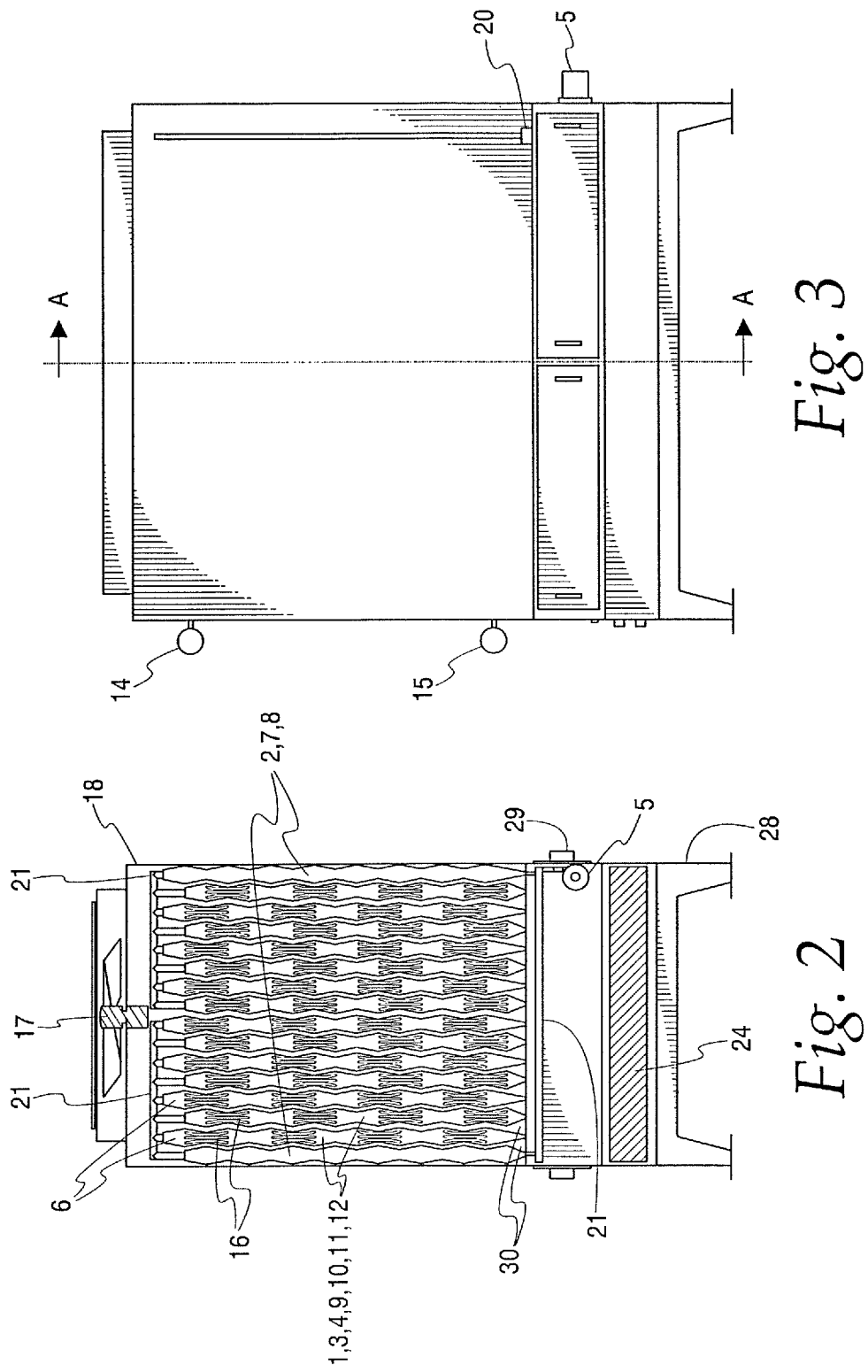

REFRIGERATIVE SYSTEM INCLUDING A REFRIGERATIVE CONDENSER/COOLER

CROSS-REFERENCE TO RELATED APPLICATIONS

This application claims priority of Provisional Ser. No. 62/372,895, filed Aug. 10, 2016, entitled "Refrigerative Condenser, Refrigerative Cooler, Refrigerative Condensation, Refrigerative Cooling, Liquid Absorption Refrigeration, Tube and Channel Heat Exchanger", the disclosure of which is hereby incorporated by reference in its entirety.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to refrigeration/cooling equipment and systems.

BACKGROUND OF THE INVENTION

The present subject matter relates generally to a condenser and cooler of refrigerants and process fluids. More specifically, a condenser in the sense of a piece of equipment that receives vaporous refrigerant at its inlet and extrudes a liquid at its outlet; in the sense of a cooler, the equipment receives a process medium and extrudes it at a lesser temperature than it was received.

The maintenance and cost of operation of current equipment requires a constant source of water in order to facilitate the removal of heat from the targeted process medium, refrigerant, or coolant. In addition to a constant source of water, substantial chemical treatment of this source water is required in order to maintain the thermal conductivity of the equipment as it is exposed to the elements as it performs its processes and is prone to scaling and contamination. Furthermore, the treated water source must also be disposed of properly if for any reason it is not capable of being retained within the previously described open system as it is typically considered hazardous to local environments and typically requires the facilitation of a waste water management program, dependent on the local, state, and federal regulations governing such handling of hazardous or otherwise harmful wastes.

Accordingly, there is a need for a process embodied by a piece of equipment that incorporates its own proprietary processes, that allows for a removal of heat from a system without the necessity of a constant source of water, chemical treatment, and waste water management program, as described herein.

SUMMARY OF THE INVENTION

To meet the needs described above and others the present disclosure provides various processes and designs that allow for a thermal displacement system to effectively displace thermal energy to an area (typically to atmosphere) where it is permissible to be removed to without further interference upon the system.

By providing a "refrigerative" process of condensation (for refrigeration systems) and a "refrigerative" process of cooling (for cooling systems not utilizing vapor compression), embodied by a piece of equipment known as a "refrigerative condenser", or "refrigerative cooler" respectively, and utilizing a process disclosed herein as "liquid absorption refrigeration" within these aforementioned processes and equipment, a process fluid or vapor is capable of having its unwanted thermal energy effectively removed without the need for a constant source of water, subsequent chemical treatment, or waste water management associated with such previously implemented processes.

By implementing the process and design features noted above, the solution provides a means to effectively displace unwanted thermal energy by utilizing a closed loop "refrigerative" process that is capable of transferring heat from the target medium, through the "refrigerative" process to atmosphere or any other external medium deemed appropriate to have the unwanted energy removed to.

The required elements of the solution include a proprietary heat exchanger design referred to as a "tube and channel heat exchanger" which allows for the flow of a strong solution to pass over a coil containing the target medium to have heat removed from, and then subsequently allows for the evaporated portion of the strong solution (having removed heat from the medium within the coil section) to be condensed upon the interior surface of the exchanger as heat is transferred to a heat exchange medium that is channeled through the exterior of the exchanger.

In order to facilitate the function of the previously mentioned "Tube and Channel Heat Exchanger", a proprietary process of heat exchange is utilized. Known as and disclosed herein as "Liquid Absorption Refrigeration", it utilizes either a heterogeneous or homogenous "strong solution", which a portion of evaporates when exposed to the target medium; this portion of evaporated solution is referred to as the refrigerant, as it requires a recurring phase change in order to effectively transfer heat from both the primary medium and the remaining unevaporated solution, which after separation from the refrigerant due to evaporation, is referred to as the "absorbent". After the refrigerant condenses on the interior surface of the channel section of the exchanger it flows, as a liquid, into the absorbent. Upon contact with the absorbent, a portion of the liquid refrigerant evaporates again and flows back to the interior surface of the exchanger, as a vapor, to be condensed back into a liquid, this portion of the process effectively removes the heat from the absorbent that was picked up as it passed over the coil section of the heat exchanger when the absorbent was combined with the liquid refrigerant as a strong solution, being both liquid refrigerant and liquid absorbent. The function of the refrigerant being absorbed by the absorbent, only when the refrigerant has achieved a liquid state, lends to the proprietary nature of the process and warrants the distinction through nomenclature to be defined as: "liquid absorption refrigeration". Additionally, novel nomenclature of various portions of this process shall be defined through drawings and otherwise further portions of this application through the use of illustration and subsequent terminology.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

Other objects, features, and advantages of the invention will become apparent from a review of the entire specification, including the appended claims and drawings.

BRIEF DESCRIPTION OF THE DRAWINGS

FIG. 2 is a section view of a tube and channel heat exchanger for use in implementing the system of FIG. 1 taken along line A-A FIG. 3;

FIG. 3 is a right side elevational view of the heat exchanger of FIG. 2;

The drawing figures depict one or more implementations in accord with the present concepts, by way of example only, not by way of limitations. In the figures, like reference numerals refer to the same or similar elements.

DETAILED DESCRIPTION OF THE PREFERRED EMBODIMENT

Figure 1:
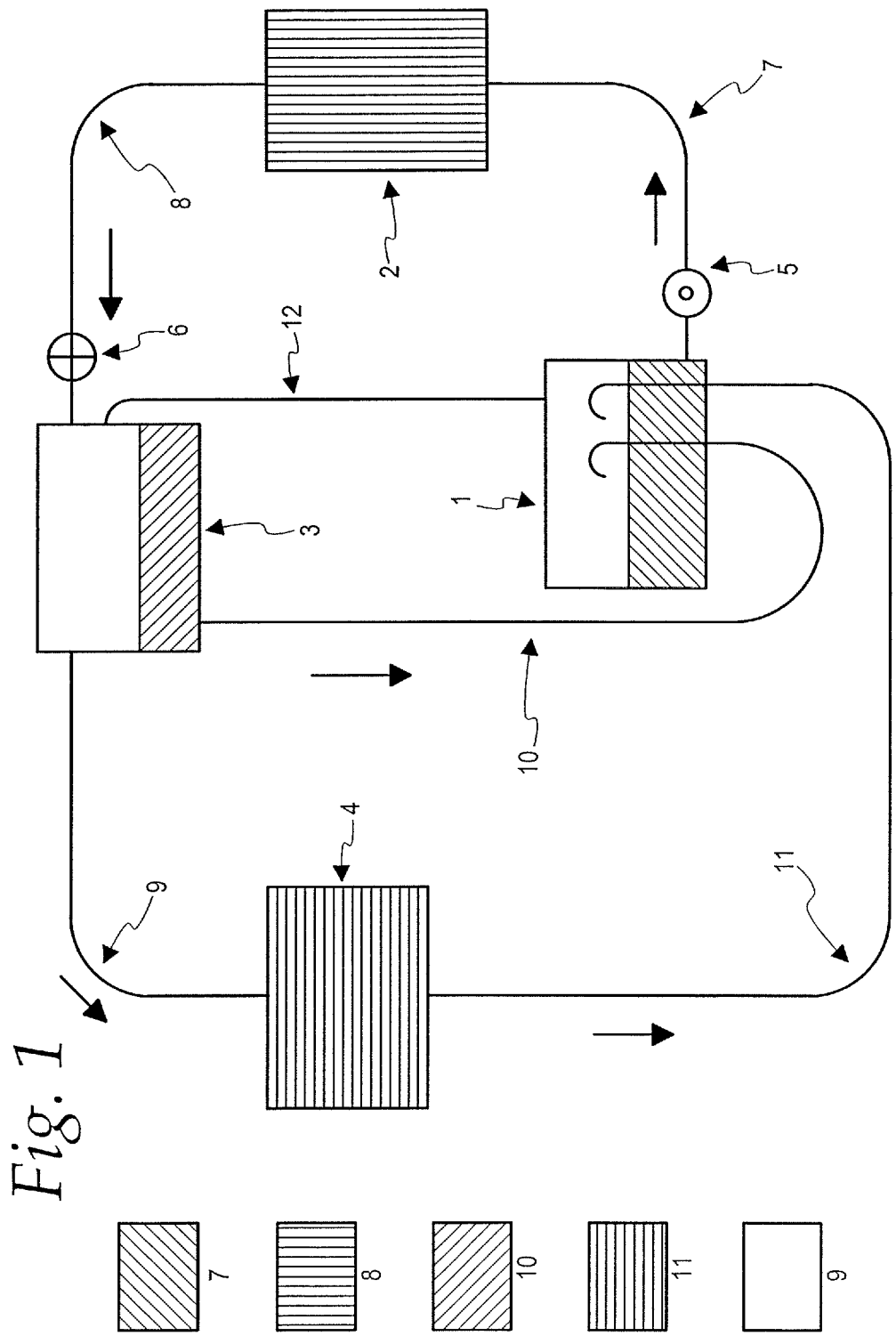
FIG. 1 is a diagrammatic representation of a liquid absorption refrigeration system according to this disclosure.
Figure 5:
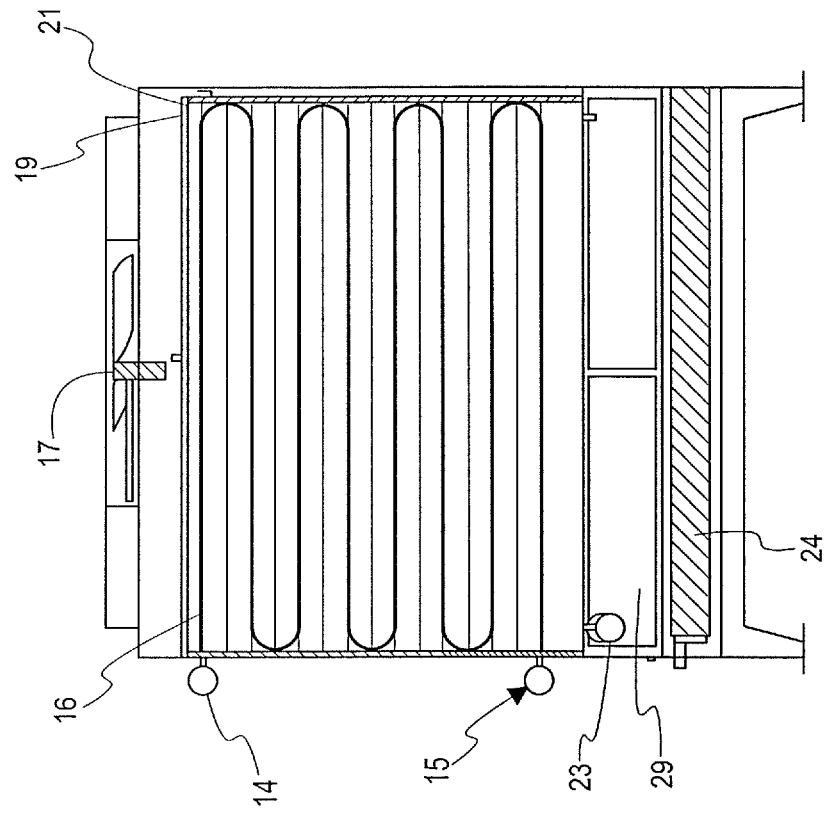
FIG. 5 is a section view taken from line B-B in FIG. 4.
Figure 4:
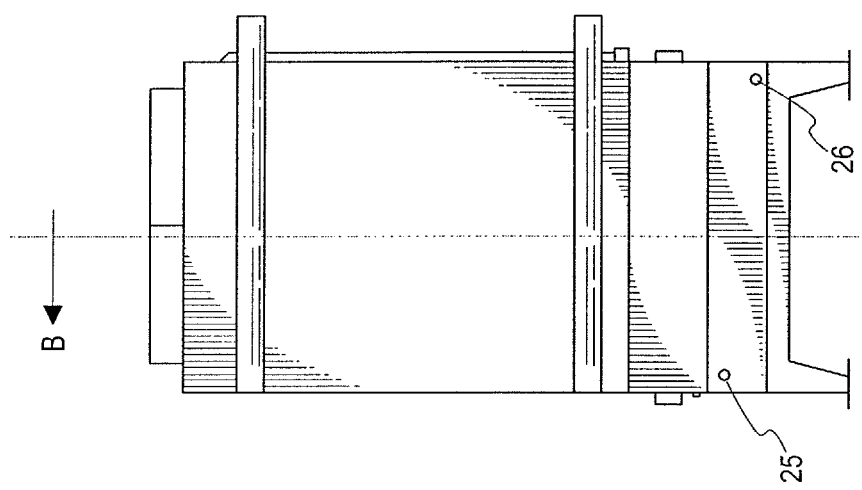
FIG. 4 is a front elevational view of the heat exchanger of FIGS. 2 and 3.
Figure 6:
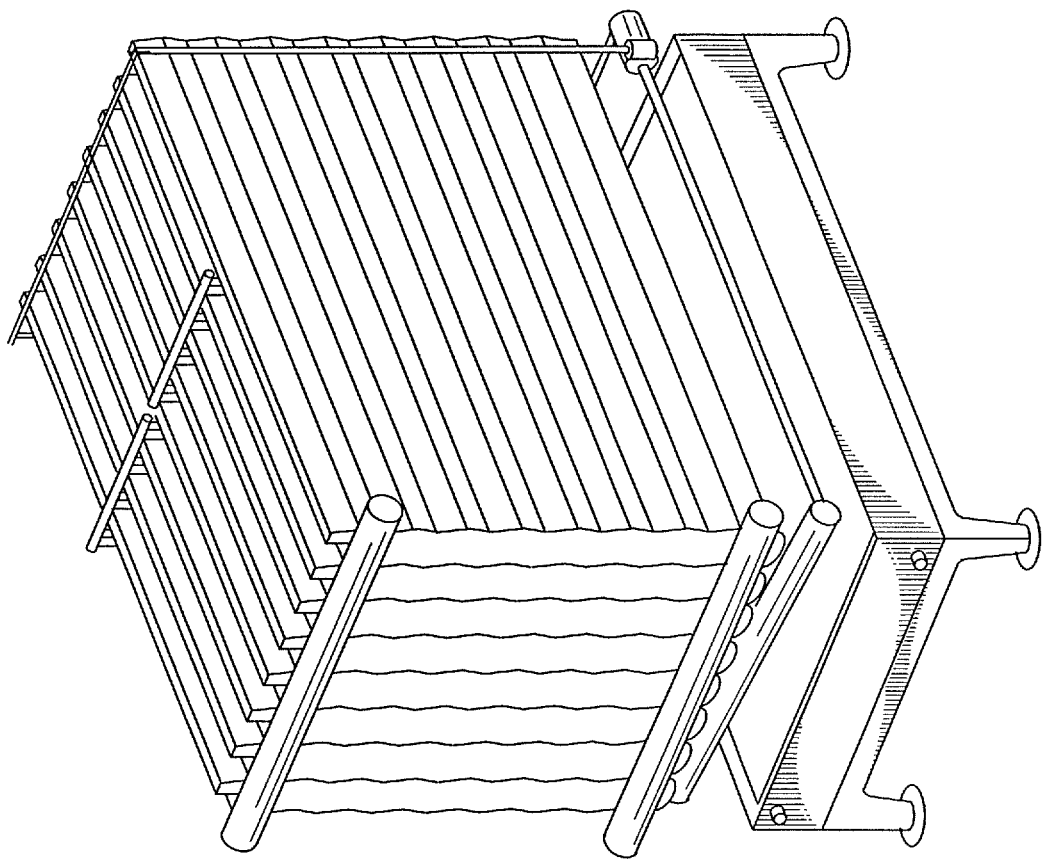
FIG. 6 is a perspective view of the heat exchanger of FIGS. 2-5 with selected components, including an outer housing component, removed for purposes of illustration.
Figure 7:
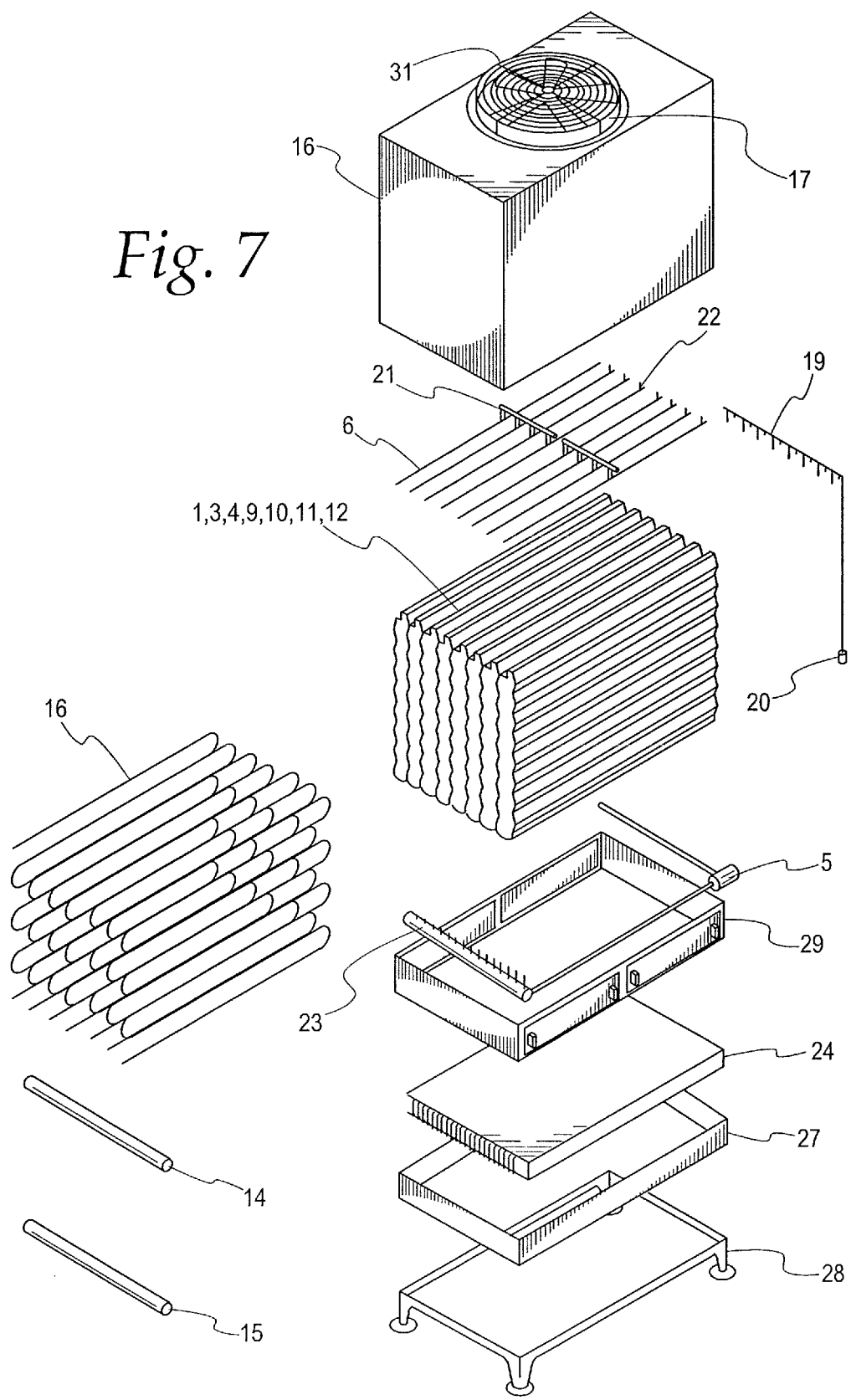
FIG. 7 is an exploded perspective view of the heat exchanger of FIGS. 2-6.
Figures 8, 9:
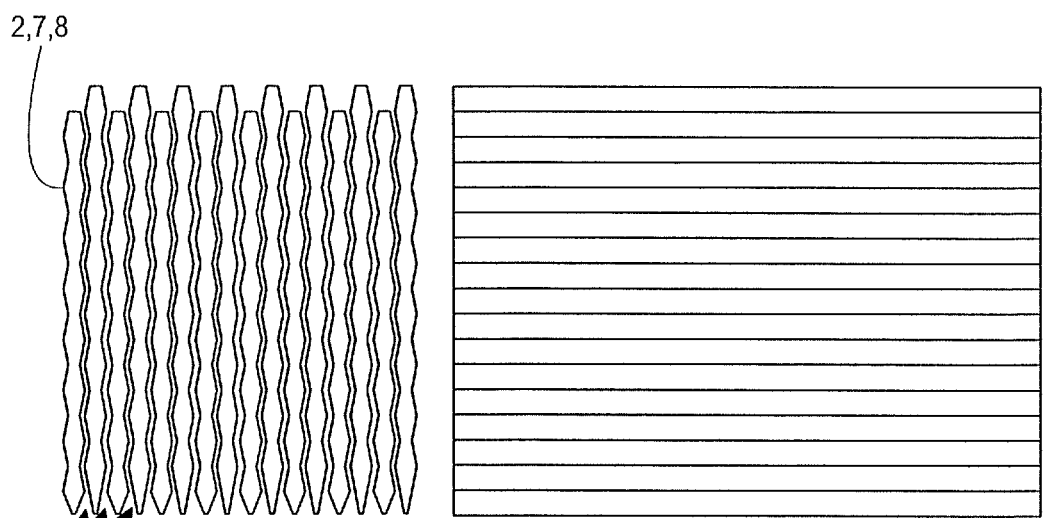
FIG. 8 is a somewhat diagrammatic view from the front of selected components that form vertical flow channels within the heat exchanger of FIGS. 2-6.
FIG. 9 is a side elevational view of the components of FIG. 8.
Figure 10:
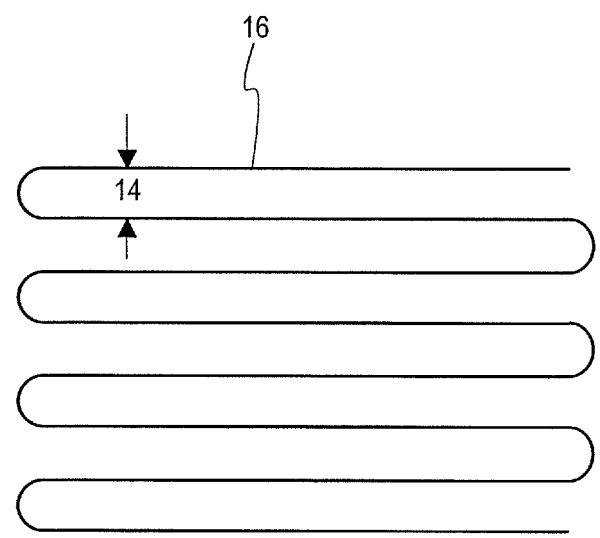
FIG. 10 is a side elevational view of a coil component of the heat exchanger of FIGS. 2-9.
Figure 11:
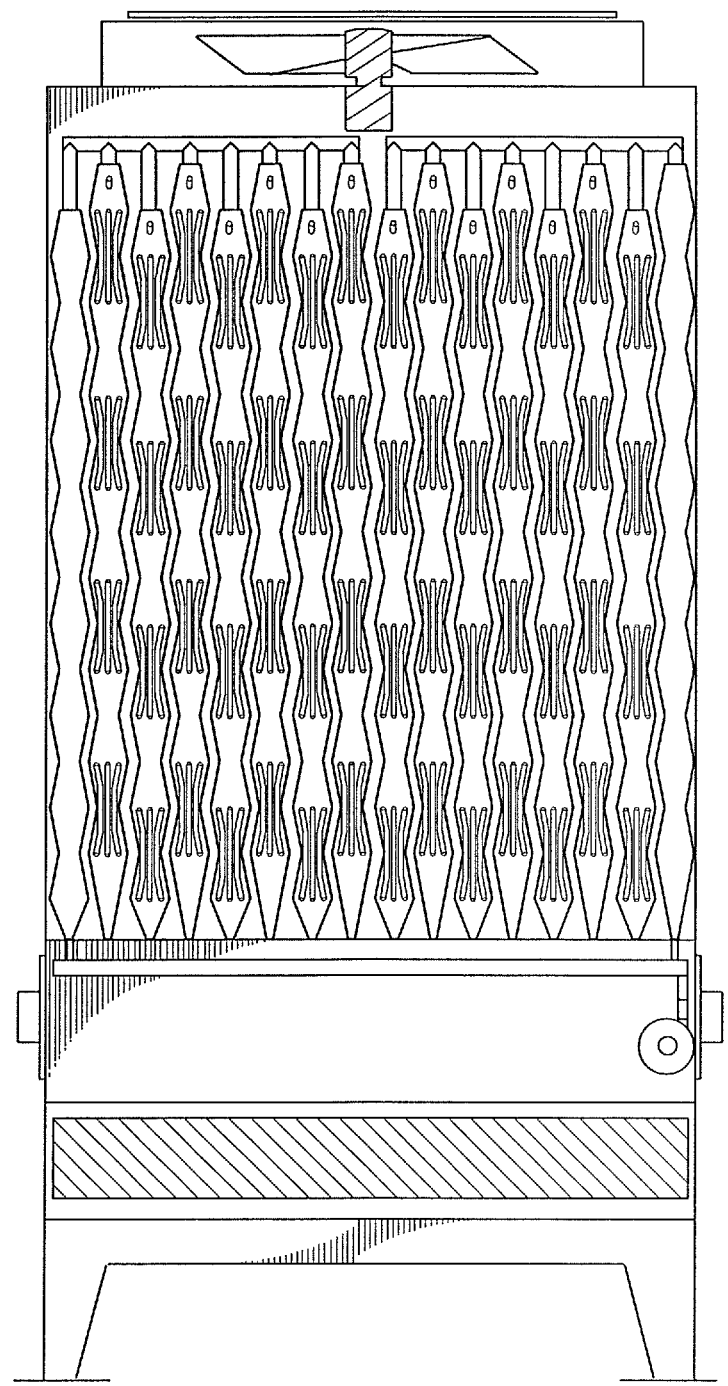
FIG. 11 is an enlarged view similar to FIG. 1.
Figure 12:
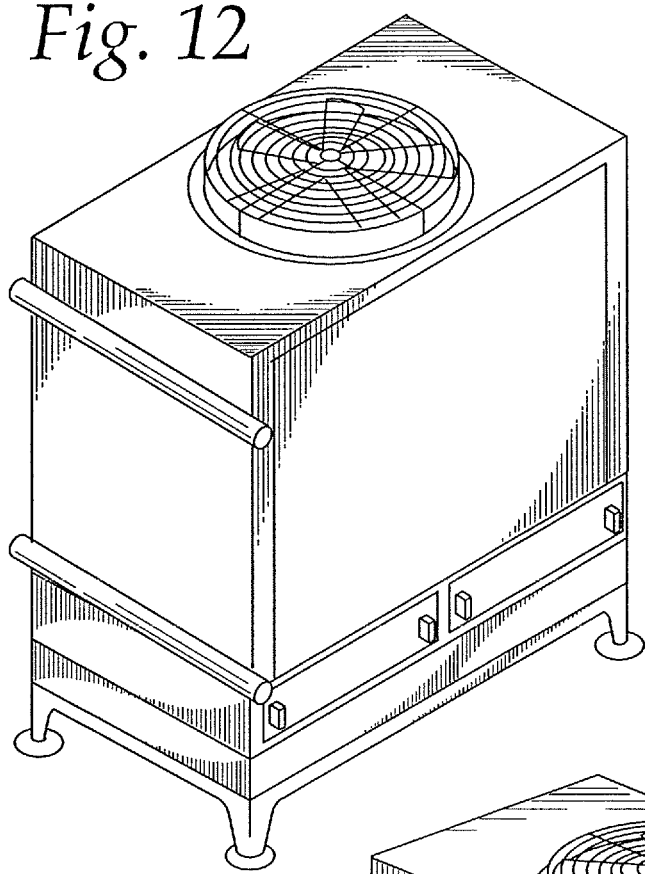
FIG. 12 is an perspective view from the front and above of the heat exchanger of FIGS. 2-11.
Figure 13:
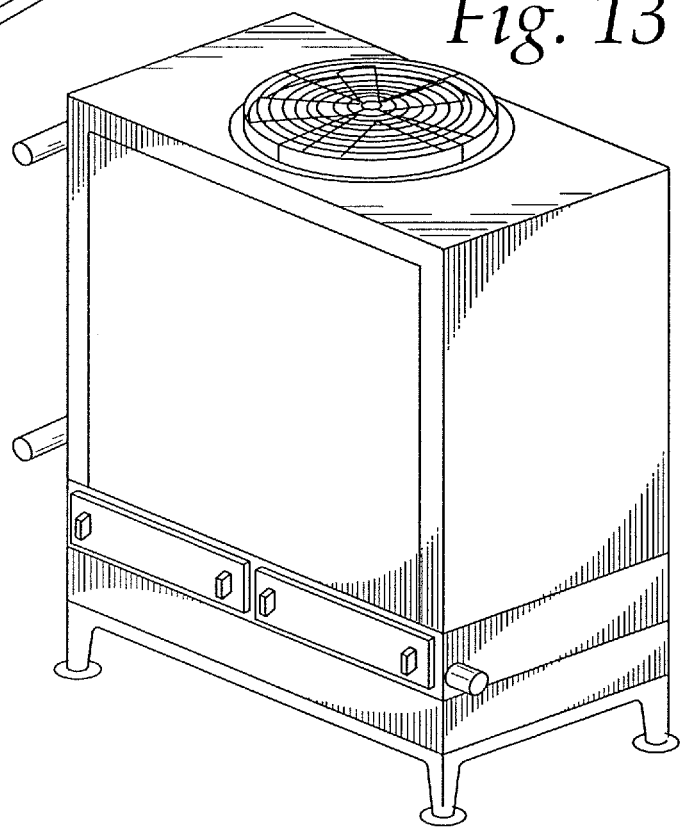
FIG. 13 is an perspective view from above and behind the heat exchanger of FIGS. 2-12.

FIG. 1 illustrates the process of "Liquid Absorption Refrigeration" as it could occur within a multitude of implementations that are not limited by the function of the processes and designs incorporated by the "Tube and Channel Heat Exchanger", "Refrigerative Cooler", and "Refrigerative Condenser", The directional arrows indicate the flow of the strong solution, refrigerant, and absorbent in their respective and various states throughout the system. The illustration also enumerates the terminology of the various components, proprietary in nature of terminology and orientation within the system as made distinguishable by way of the reference numerals. The reference numerals that FIG. 1 utilizes are applicable to both the aforementioned designs as well as the processes they embody as they are enumerated in FIGS. 2-13.

FIGS. 2-13 illustrate the process of "Liquid Absorption Refrigeration" as it facilitates the processes of both "Refrigerative Condensation", within a "Refrigerative Condenser", as well as "Refrigerative Cooling" within a "Refrigerative Cooler" by means of the "Tube and Channel Heat Exchanger". The functions of the "Liquid Absorption Refrigeration" process within a "Tube and Channel Heat Exchanger" are as follows: The saturated strong solution (7) is transferred from the absorber (1); the absorber (1), being defined as beginning at the liquid level of the saturated strong solution (7) as it is situated within a section of the tube and channel heat exchanger (13) and ending at the inlet of the strong solution pump (5); through the strong solution return header (23) to the regenerator section (2,7,8). As air or other appropriate medium is passed over the exterior of the regenerator (2) latent heat is removed from the pressurized saturated strong solution (7) to the point of saturation and continues to remove sensible heat causing the subcooled strong solution (8). This is made possible without cavitation of the strong solution by maintaining a pressurized portion of the system in between the outlet of the strong solution pump (5) and the inlet of the expansion device(s) (6), this pressurized portion allows for the boiling point of the strong solution (7) to be raised above the temperature of the exterior process medium (in the case of the particular tube and channel heat exchanger (13) used within this application, air). The subcooled strong solution (8) flows through another strong solution supply header (21) then passes through the expansion device(s) (6) creating a pressure differential which lowers the subcooled strong solution (8) to the pressure of the low side of the system. After passing through the expansion device(s) (6) the subcooled strong solution (8) enters into the tube and channel heat exchanger section (1,3,4,9,10,11,12) where it contacts the evaporator (3) surface which in the case of the tube and channel heat exchanger (13) is the exterior surface of the target medium coil (16). Upon contacting the target medium coil (16) the subcooled strong solution (8) absorbs the sensible and latent heat of the target medium being radiated through the target medium coil (16), subsequently the subcooled strong solution (8) separates as the refrigerant portion of the strong solution, having absorbed the majority of the latent heat from the target medium coil (16), evaporates to become saturated refrigerant vapor (9). Upon the evaporation of the refrigerant from the strong solution, the remaining liquid fluid becomes saturated liquid absorbent (10) and flows back to the absorber (1) by means of gravity when utilized within a tube and channel heat exchanger (13). The saturated refrigerant vapor (9) then travels to the condenser (4) portion of the system. Within the tube and channel heat exchanger (13), the condenser (4) is considered to be the internal surface of the exchanger. Condensation of the saturated refrigerant vapor (9) is facilitated by the flow of air that is maintained by the orientation of channel ports (30) as air is drawn over the exterior surface of the tube and channel heat exchanger (13) by the fan (17) which limits the path of least resistance of the air to the channel ports (30) by means of the external cover (18). Once the latent heat of the saturated refrigerant vapor (9) is removed to the point of condensation by the channeled air, the condensed saturated liquid refrigerant (11) flows to the absorber by means of gravity when utilized within a tube and channel heat exchanger (13). When the saturated liquid refrigerant (11) contacts the saturated liquid absorbent (10) within the absorber (1) a portion of the saturated liquid refrigerant (11) evaporates causing a latent heat transfer to occur which effectively removes any heat that the saturated liquid absorbent (10) received from contact with the target medium coil (16). Upon evaporation, the saturated refrigerant vapor (9) flows through the absorber-evaporator equalizer (12) to the condenser (4) to have the latent heat transferred from the saturated liquid absorbent (10) rejected to the induced airflow being drawn through the channel ports (30). The portion of the saturated liquid refrigerant (11) that did not evaporate when coming into contact with the saturated liquid absorbent (10) combines to form the saturated strong-solution (7) within the absorber (1) that will be continuously circulated through the system as it has been previously described by this section of the application. The incorporation of a vacuum evacuation header (19) allows for the internal pressure of the "Liquid Absorption Refrigeration" system to be reduced to a point where the saturated liquid refrigerant (11) portion of the saturated strong solution (7) is able to evaporate at the desired condensing temperature and/or the desired outlet temperature of either a refrigerant or process medium that is travelling via the target medium inlet (14) through the target medium coil (16) and exiting by means of the target medium outlet (15). The vacuum connector (20) is the port where a vacuum pump or similar device would be mated in order to remove any non-condensable material that could potentially increase the operating pressure of the inherent system above the desired value. To those skilled in the art, it becomes apparent that the desired condensing temperature or outlet temperature of the target medium is controlled by the temperature at which the saturated liquid refrigerant (11) evaporates and subsequently condenses. In areas where the ambient temperature of the air; which is drawn through the channel ports (30) of both the tube and channel heat exchanger section (1,3,4,9,10,11,12) and the regenerator section (2,7,8); is above the desired condensing or outlet temperature, the addition of a temperature differential moisture induction coil (24) is placed in between the inlet of induced airflow located between the support structure (28) and either the bottom of the access panel section (29) or the bottom of the TDMI section (27)} and the channel ports (30); creating a TDMI section (27); within which both sensible and latent heat is removed from the incoming airflow while the moisture content is condensed to a liquid which subsequently is drawn through channel ports which may, but not necessarily, produce a wet bulb cooling effect upon the exterior surface of both the tube and channel heat exchanger section (1,3,4,9,10,11,12) and the regenerator section (2,7,8). The process medium which absorbs the thermal energy of the air being drawn through the TDMI Coil (24) as well as the TDMI inlet (25) and outlet (26) may be any readily available process medium that is utilized in the surrounding physical plant that is below the desired condensing or outlet temperature of the target medium; which may include; but is not limited to; glycol being used for underfloor heating, chilled process medium, or an appropriately conditioned liquid refrigerant which may or may not be the target medium after it exits the target medium coil (16) through the target medium outlet (15). The addition of an access panel section (29) allows for those skilled in the art to not only inspect and maintain the external surfaces of the enclosed equipment, but to also bypass the TDMI section (27) when ambient conditions, such as those experienced in the winter climates of certain areas, permits for an adequate amount of temperature differential between the aforementioned ambient air temperature and the desired condensing or outlet temperature of the target medium.

FIGS. 6, 7, 12 and 13 illustrate perspective views of the "Refrigerative Condenser" and "Refrigerative Cooler", as they incorporate the "Tube and Channel Heat Exchanger" to produce the processes inherent to each with the distinction respectively between the two being made by the target medium that heat is being removed from, through the use of the "Liquid Absorption Refrigeration" process. Respectively, a "Refrigerative Condenser" when a refrigerant is being condensed, and a "Refrigerative Cooler" when a process medium is not undergoing a state change as it travels through the equipment; merely a removal of its inherent thermal energy.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. A refrigerative device comprising:
    an absorber section to contain a saturated strong solution;
    a pump connected to an outlet of the absorber section to receive saturated strong solution therefrom;
    a regenerator section connected to an outlet of the pump to receive a flow of pressurized saturated strong solution therefrom;
    an expansion device connected to an outlet of the regenerator section to receive a flow of subcooled strong solution therefrom;
    an evaporator section connected to an outlet of the expansion device to receive the subcooled strong solution therefrom, the evaporator section connected to the absorber section to return strong solution thereto; and
    a condenser section connected to the evaporator section configured to receive a refrigerant evaporated from the subcooled strong solution in the evaporator, the condenser section connected to the absorber section to return liquid refrigerant thereto.

2. The refrigerative device of claim 1 wherein the regenerator section comprises at least one vertically extending channel.

3. The refrigerative device of claim 1 wherein the evaporator section comprises a coil.

4. The refrigerative device of claim 1 further comprising a plurality of vertically extending cooling flow channels to direct a cooling flow through the refrigerative device.

5. A refrigerative device comprising:
    first, second and third vertically extending channels positioned adjacent each other, the first channel having an inlet for receiving a flow of working fluid, the third channel having an inlet connected to an outlet of the first channel for receiving the flow of working fluid therefrom, and the second channel positioned between the first and third channels and having an inlet for receiving a cooling medium flow and an outlet for discharging the cooling medium flow after it has absorbed heat from the first and third channels; and
    a coil positioned within the third vertical channel and having an inlet for receiving a target medium flow and an outlet for discharging the target medium after it has been cooled by the working fluid flowing through the third vertical channel.

\* \* \* \* \*